United States Patent [19]

Hauck

[11] Patent Number: 5,341,208
[45] Date of Patent: Aug. 23, 1994

[54] GAS BYPASS FOR BIAS REDUCTION IN LASER GYRESCOPES

[75] Inventor: James P. Hauck, Santa Ana, Calif.

[73] Assignee: Rockwell International Corporation, Seal Beach, Calif.

[21] Appl. No.: 496,166

[22] Filed: May 19, 1983

[51] Int. Cl.$^5$ .............................................. H01S 3/081
[52] U.S. Cl. ........................................ 356/350; 372/94
[58] Field of Search ................... 372/58, 94, 92, 93; 356/350

[56] References Cited

U.S. PATENT DOCUMENTS 4,397,027 8/1983 Zampiello .......................... 372/94

*Primary Examiner*—Nelson Moskowitz
*Attorney, Agent, or Firm*—H. Fredrick Hamann; George A. Montanye; Tom Streeter

[57] ABSTRACT

A ring laser gyro, having: an envelope for an optically resonant cavity having a gain bore section, the envelope containing an active gas medium. The envelope contains electrically energizable electrode means having at least two electrodes at electrode locations within the envelope for establishing an electrical discharge in an active gas medium between the electrode locations. The electrical discharge excites a pair of light beams along a lasting path between the electrode locations. The light beams counterpropagate in the optically resonant cavity. The envelope is coupled to means for generating an output signal for the gyro by measuring a difference in the frequencies of the light beams. The active gas medium has an axial current driven gas flow and a return gas flow induced by the electrical discharge, the resultant gas flow contributing to bias errors in the output signal. The envelope also comprises a gas bypass cavity adapted to pneumatically couple the electrode locations along the gain bore. The gas bypass cavity has a length adapted to inhibit ionization of the gas medium within the bypass cavity and also has a cross-section selected to reduce axial current driven gas flow between the respective electrode locations. The gas bypass cavity reduces the tendency of the ring laser gyro to exhibit bias errors by providing an alternate path for the return gas flow. The gas bypass cavity also operates to reduce the differential pressure between the respective electrode locations. The gas bypass cavity is equipped with a means for controlling the return gas flow.

20 Claims, 5 Drawing Sheets

GAS BYPASS FOR BIAS REDUCTION IN LASER GYRESCOPES

BACKGROUND OF THE INVENTION

1. Field of the Invention

The present invention relates to ring laser gyroscopes and more particularly to ring laser gyroscopes which have bias errors resulting from axial current driven gas flow within the active gas medium.

2. Description of Prior Art

In ring laser gyroscopes, a pair of counter-rotating monochromatic light beams are propagated within a sealed cavity about a closed-loop optical path. The two beams travel in opposite directions around the closed-loop optical path. As the gyroscope cavity rotates in inertial space, the two oppositely traveling beams travel unequal path distances. A component of each light beam is extracted at a single point within the cavity, the point being referenced to the ring laser gyro housing where each of the two components are focused on a suitable detector. The two beams reach the detector having a relative frequency difference resulting from the rotational rate of the gyroscope housing in inertial space. The relative frequency difference is detected as an electrical beat signal which is then electronically interpreted to indicate the direction and inertial rate of rotation of the ring laser gyro housing about the gyro's sensitive axis.

Lasing is typically obtained by applying a DC current source having a voltage sufficient to sustain a discharge in the active gas medium. The discharge is supported between spaced-apart electrodes. The discharge, or plasma excitation current produces a plasma flow of ionized gas between oppositely polarized electrodes in the optical cavity. It has long been known that this plasma flow tends to induce a bias error in the detected signal of a ring laser gyro. Ring laser gyros that use direct current excitation are therefore typically provided with a balanced electrode structure wherein two electrodes of one polarity are symmetrically disposed at each end of the gyro's gain bore about a single electrode of the opposite polarity positioned at the center of the gain bore. This structural arrangement produces two equal and symmetrical plasma flows of ionized gas thereby substantially reducing the bias errors in the detected beat signal.

The active gas medium in a ring laser gyro is typically excited by a DC current source producing a voltage drop between the cathode and each of the two respective anodes. The current source delivers relatively balanced currents to each respective anode through respective active gas medium segments. The plasma flow of ionized gas, produced in response to the current flow, contributes to a return gas flow between electrodes of opposite polarity. The total ring laser gyro bias error in the detected beat signal is related to the magnitude of the pressure difference between electrodes of opposite polarity.

SUMMARY

It is a major objective of this invention to provide a ring laser gyro having reduced bias errors and bias error sensitivity. The bias error is the difference between the signal that the laser gyro should produce at its output based on its rotation rate in inertial space and the signal that it actually produces.

Another object of the invention is to provide a gas bypass between locations adjacent to electrode locations of opposite polarity through apertures in the gain bore in the lasing path. The gas bypass operates to control the return gas flow and reduce the pressure differential between electrode locations of opposing polarity; thereby, contributing to a reduction in bias errors.

These and other objectives of the invention are realized in a ring laser gyro, comprising: an envelope for an optically resonant cavity having a gain bore, the envelope containing an active gas medium. The ring laser gyro also includes an electrically energizable electrode means having at least two electrodes at electrode locations within the envelope for establishing an electrical discharge in the gain bore and active gas medium between the electrode locations. The electrical discharge thereby excites a pair of light beams along a lasing path between electrode locations, the light beams counter-propagating in the optically resonant cavity. The ring laser gyro also includes a means for generating an output signal for the gyro by measuring a difference in the frequencies of the light beams. The active gas medium has an axial current driven gas flow and a return gas flow induced by the electrical discharge. The axial current driven gas flow contributes to bias errors in the output signal.

The ring laser gyro also includes a gas bypass cavity adapted to pneumatically couple the electrode locations, the gas bypass cavity having a cross-section selected to provide an alternate and controlled path for the return gas flow between the respective electrode locations; whereby, the gas bypass cavity reduces the tendency of the ring laser gyro to exhibit bias errors in its output signal by reducing the return gas flow in the active gas medium by providing a gas bypass cavity through which differential pressure between respective electrode locations is reduced.

The gas bypass cavity has a pneumatic path length in excess of the pneumatic path length of the lasing path between the electrode locations. The gas bypass pneumatic path length is selected to inhibit ionization of the gas medium within the gas bypass cavity.

In another alternative embodiment, the invention ring laser gyro envelope has three optical path segments coupled to form the optically resonant cavity in the shape of a triangle.

DESCRIPTION OF THE PREFERRED EMBODIMENT

Figure 1:
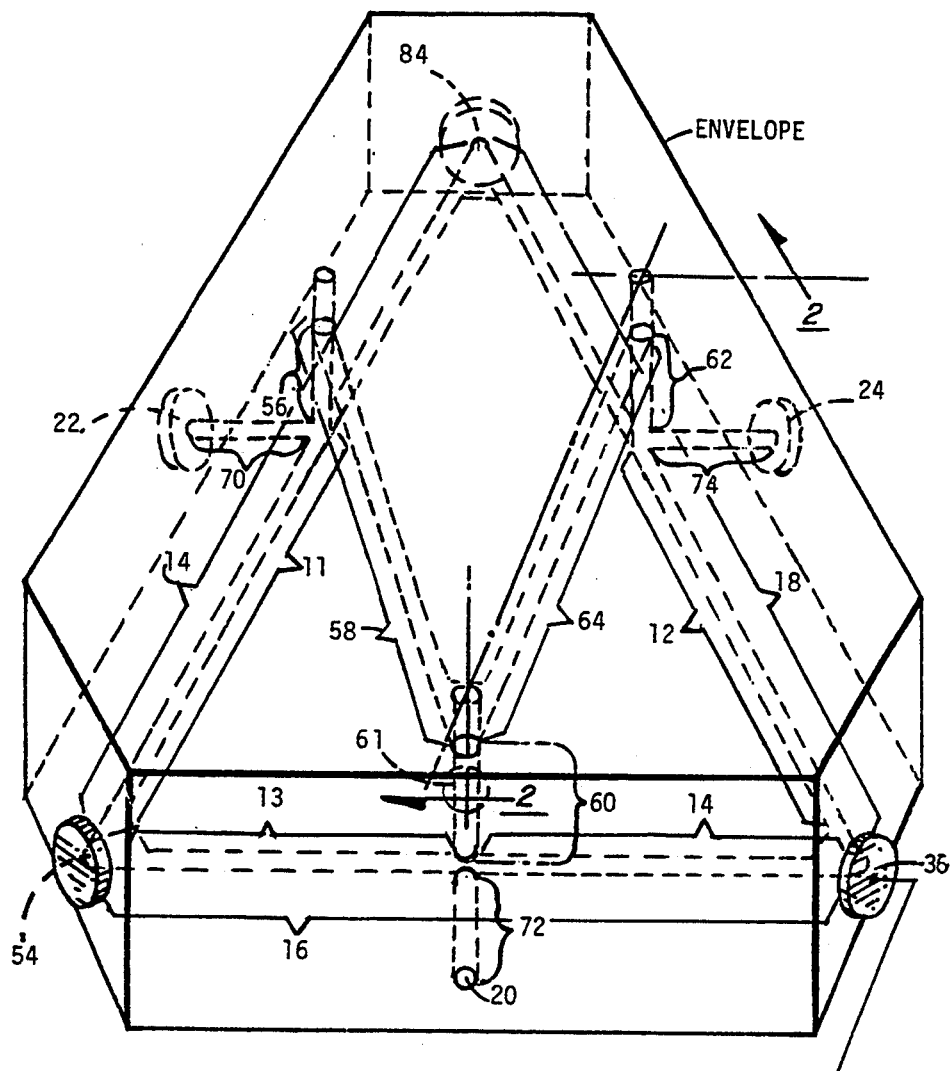
FIG. 1 is a perspective view of the triangular embodiment of the Ring Laser Gyro body showing the gas bypass cavities in phantom.

Referring now to FIG. 1, a first alternative embodiment of the invention ring laser gyro is shown having an envelope 10 for an optically resonant cavity shown in phantom having lasing paths 14, 16 and 18. The gain bore is that portion of the optically resonant cavity having segments 11, 12 and 16. The envelope contains an active gas medium (not shown) confined within the optically resonant cavity. The ring laser gyro typically has electrically energizable electrode means (not shown) having at least two electrodes at electrode locations, such as a cathode at the cathode location at 20, an anode 1 at the anode 1 location 22 and anode 2 at the anode 2 location at 24. The electrodes are typically located within or coupled to the envelope 10 to establish an electrical discharge in the active gas medium in the gain bore between the electrode locations 20, 22, 24; thereby exciting a pair of light beams (not shown). The light beams counterpropagate in the optically resonant cavity through the gain bore and along the lasing path 14, 16 and 18.

A means for generating an output signal for the ring laser gyro by measuring a difference in the frequencies of the counterpropagating light beams (not shown) is depicted as block 30 coupled optically to partially transmissive mirror 36. Various means for generating an output signal from a ring laser gyro are known in the art such as that described in "Laser Applications" Vol. 1, pg. 139, 197, by Academic Press. With the gyro body at rest in inertial space, counterpropagating light beams are phased to cancel each other's effect. As the ring laser gyro body 10 is rotated on the gyro's sensitive axis (not shown) but central and normal to the plane and perimeter formed by lasing paths 14, 16, 18, the counterpropagating light beams travel slightly different relative path lengths, in a fixed period of time, due to of the rotational rate of the envelope 10 about the gyro's sensitive axis. As a result of the slight difference in relative path lengths traveled, the counterpropagating light beams sensed by the means for generating an output signal, i.e. block 30, produce a signal that relates to the direction of rotation and to the absolute angular rate of the ring laser gyro body on its sensitive axis.

The active gas medium (not shown) contained in the optically resonant cavity has an axial current driven gas flow induced by the electrical discharge and a return gas flow. The axial current driven gas flow (not shown) is referred to as Langmuir flow and the return gas flow, (also not shown) is referred to as Poiseuille flow. The axial current driven gas flow and the return gas flow are unequal which results in a small pressure differential between electrode locations of opposite polarity.

Gas bypass cavity 52, comprising segments 56, 58, 60, 64 and 62, is adapted to pneumatically couple the electrode locations, such as cathode location 20 to the anode 1 location at 22 and to the anode 2 location at 24. The gas bypass cavity typically has a circular cross section; however, other cross-sectional shapes are anticipated to be of use and to include cross-sectional shapes such as eliptical, square, rectangular or triangular. The cross-sectional shape, size and length is adapted to reduce the return gas flow within the gain bore and between the respective electrode locations such as cathode location 20, anode 1 location at 22 and anode 2 location at 24 by providing an alternate pneumatic path through which part of the return gas flow can be guided and controlled.

By pneumatically coupling the above referenced locations, the gas bypass cavity also serves to reduce the pressure differential between electrode locations of opposite polarity. The reduced pressure differential is believed to contribute to a reduction in the ring laser gyro bias errors.

The gas bypass cavity 52 pneumatic path length, consisting segments 60 plus 58 plus 56, is adapted to have a length in excess of the pneumatic and lasing path length along the associated gain bore path segments such as segment 13 and segment 11. The gas bypass cavity pneumatic path length, consisting of segments of 60 plus 64 and 62, is adapted to have a length in excess of the pneumatic and lasing path length along the associated gain bore path segments such as segments 15 and 12. By providing a gas bypass cavity pneumatic path length in excess of the pneumatic path length of the gain bore between the respective electrode locations, ionization of the gas medium within the gas bypass cavity is inhibited.

Figure 2:
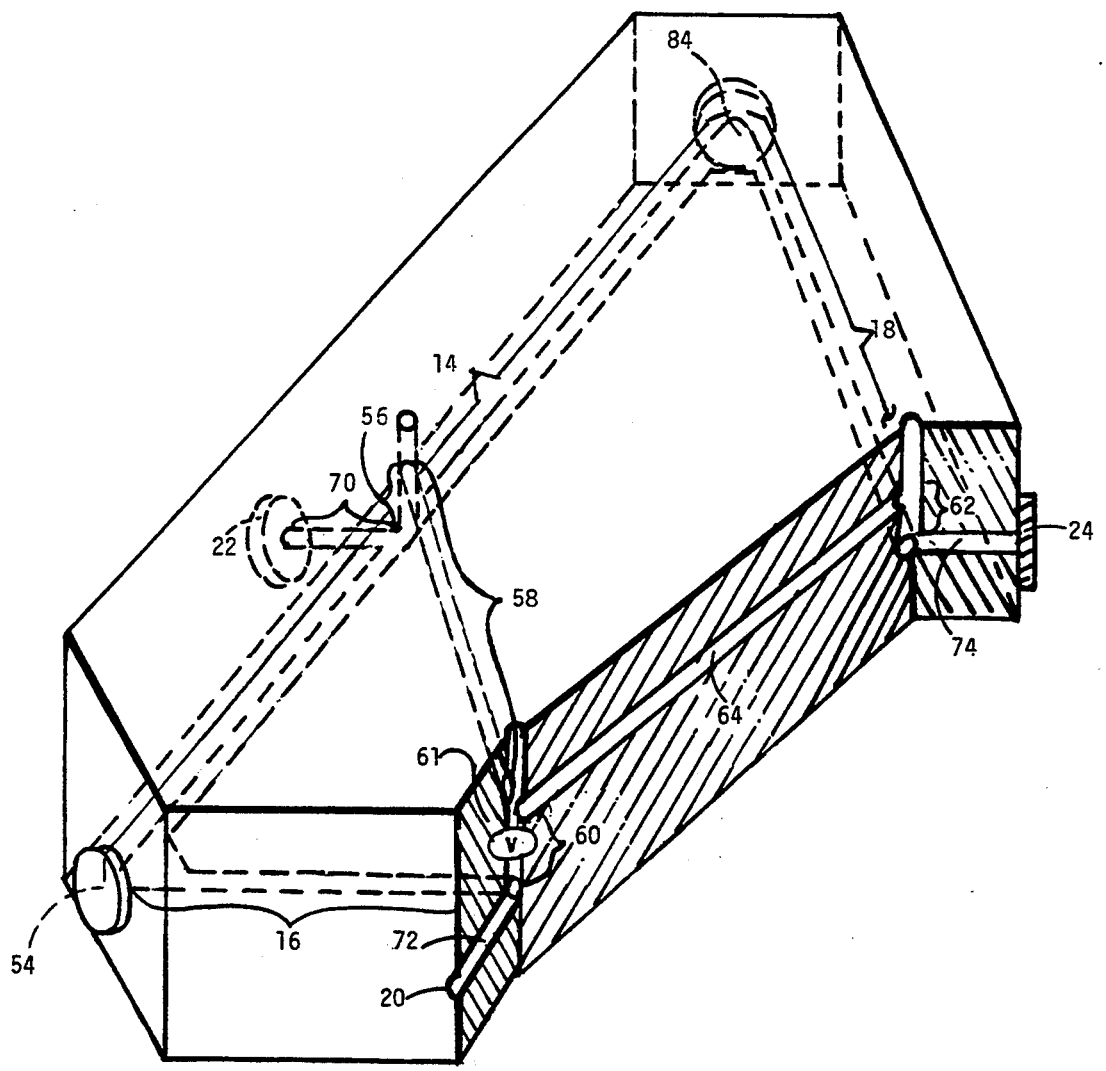
FIG. 2 is a perspective view, partial section and partial elevation taken along line 2—2 of FIG. 1.
Figure 4:
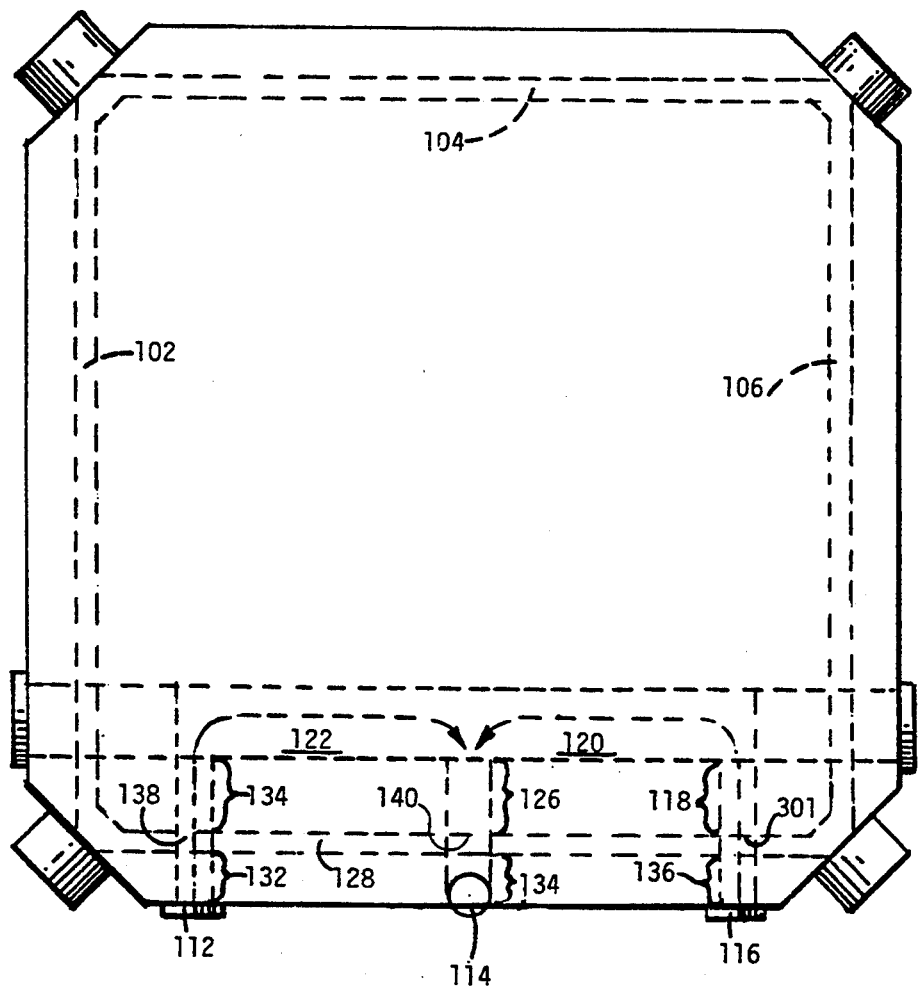
FIG. 4 is a plan elevation view of a rectangular ring laser gyro body showing a square lasing path and a gas bypass cavity having a cross-section larger than that of the lasing path, each being shown in phantom.
Figure 6:
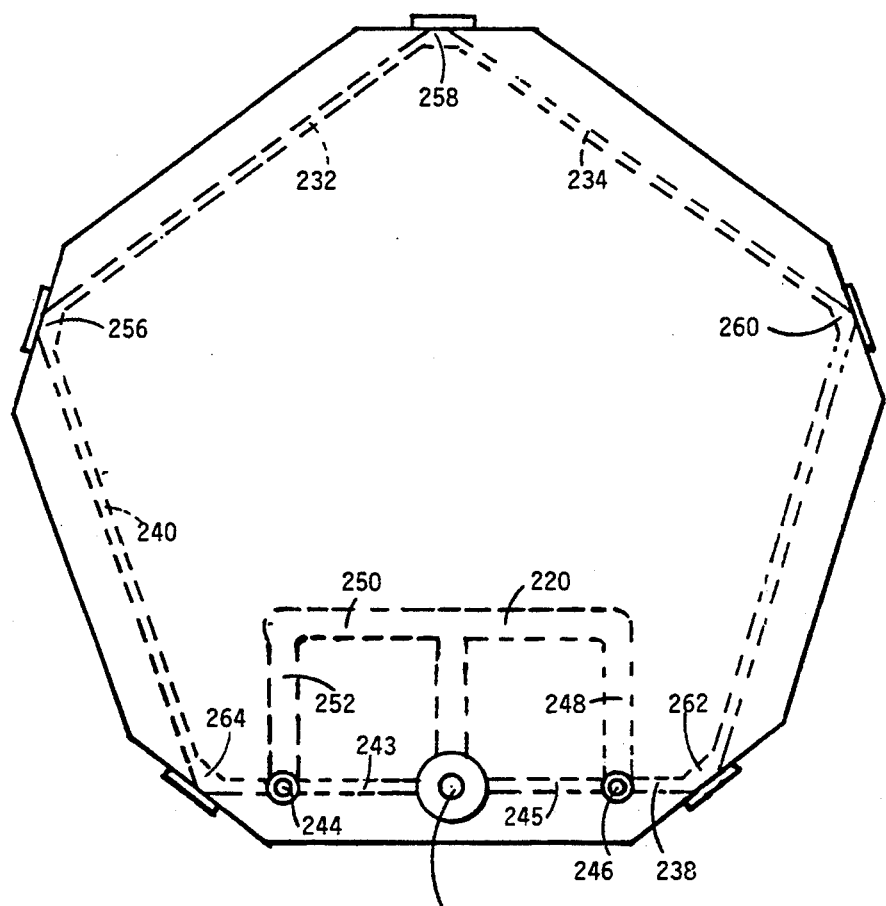
FIG. 6 is a top plan view of a five-sided ring laser gyro body depicting a five-sided lasing path and a gas bypass cavity in phantom.

Referring to FIG. 2, the three-sided envelope 10 of FIG. 1 is depicted with a sectional view taken along gas bypass cavity segments 60, 64 and 62. The gas bypass segments 58 and 64 respectively are shown as being straight; however, it is to be understood, that these segments can be configured as other than straight segments as required to achieve the necessary path lengths to inhibit ionization and to obtain a pneumatic impedance adapted to minimize the gyro bias error. In addition, although gas bypass segments 58 and 64 are shown to be contained within body 10, it is to be understood, that these gas bypass segments can be constructed as hollow segments or tubes, outside of, but in close proximity with body 10, as required to inhibit ionization. Other configurations, such as those shown in FIGS. 4 and 6 depict arrangements where the gas bypass consisting of segments 134, 122, 126, 120, and 118 in FIG. 4 and segments 252, 250, 222, 220, and 248 in FIG. 6 is coplanar with the plane of the plane of the optically resonant cavity. FIG. 4 and FIG. 6 also show their respective gas bypass channels coupling anode locations at the ends of their respective straight gain bores, i.e., gain bore segments 128 and 130 in FIG. 4 and gain bore segments 243 and 245 in FIG. 6.

The embodiment of FIG. 2 has three optical path segments, 14, 16 and 18 coupled together within envelope 10 to form the optically resonant cavity in the shape of a triangle.

FIG. 2 shows the location of the electrically energizable electrode means comprising a cathode location at 20, a first anode location, such as anode 1 location at 22 and a second anode location, such as anode 2 location at 24. The cathode location at 20, the first anode location at 22 and the second anode location at 24 are each coupled to the active gas medium within the optically resonant cavity 12 via respective bore channels within the envelope, such as respective bore channels 70, 72 and 74. Each respective bore channel is ported into the gain bore through a respective electrode port in the gain bore section of the optically resonant cavity positioned relatively close to the electrode locations such as where bore channel 72 is shown meeting segment 16. The gas bypass cavity is shown to comprise a plurality of cavity segments, such as 60, 56, 58, 60, 64, and 62. The gas bypass cavity segments are coupled to form the gas bypass cavity. The gas bypass cavity is ported to the gain bore section of the optically resonant cavity 14, 16 and 18 at each respective electrode location through a respective gas bypass port in the optically resonant cavity, such as at those near the cathode location at 20, the anode 1 location at 22 and the anode 2 location at 24. Each respective gas bypass port is positioned relatively close but not necessarily adjacent to a respective electrode location.

Referring again to FIG. 1, the envelope 10 optical path segments such as 14, 16 and 18, each have an optical axis (not shown). The optical path segments are coupled in series pairs to link the optical axes at optical junctions, such as mirror surface 54, mirror surface 36 and mirror surface 82 to form a relatively closed optical path circuit within the envelope 10. The mirrored surfaces of mirror 54, 36 and 82 form a reflective means for directing the pair of counterpropagating light beams at the optical junctions to follow the closed optical circuit around lasing paths 14, 16 and 18. In practice, the mirrors are adjusted to position the counterpropagating light beams relatively close to the optical axis of optical path segments.

The electrically energizable electrode means typically have three electrodes coupled by the gain bore and typically consist of an arrangement, such as a cathode (not shown) at cathode location 20, the anode 1 (not shown) at anode 1 location 22 and the anode 2 (not shown) at anode 2 location 24 and the conventional power supply circuitry (not shown) required to energize the electrode means together operate to establish an electrical discharge in the active gas medium in the gain bore. The electrodes are positioned to produce relatively balanced axial current driven gas flow in the active gas medium in opposing directions, so as to reduce the net or total differential axial current driven gas flow. The cathode location at 20 is centrally positioned between the anode 1 location at 22 and the anode 2 location at 24 so as to produce axial current driven gas flow in opposite directions. The gas bypass cavity is adapted to pneumatically couple the three electrode locations and is adjusted in cross sectional size and length to minimize bias errors.

In the embodiment of FIG. 1, the three electrodes comprise a cathode at a first electrode location, i.e. at the cathode location at 20, and a first and second anode, i.e. 1 at the anode 1 location at 22 and at anode 2 location at 24, locations 22 and 24 comprising the second and third electrode locations. The cathode at cathode location 20 is positioned between the first and second anode. In another alternative embodiment the gain bore has a single optical path segment, the first, second and third electrodes each being coupled to the single optical path segment through respective electrode ports in the single optical path segment, i.e. through a straight, gain bore. The gain bore of FIG. 1 is shown having a plurality of optical path segments, i.e. 11, 12 and 16. The three electrodes are each coupled to the separate optical path segments 11, 12 and 16 through respective electrode ports (not shown) in this multisegment gain bore.

In another alternative embodiment, the three electrodes comprise an anode at a first electrode location and a first and second cathode at a second and third location, the anode being positioned between the first and second cathodes.

In this alternative embodiment, the gain bore has a single optical path segment, the first, second and third electrodes each being coupled to the single optical path segment through respective electrode ports in the single optical path segment, i.e. through a straight, gain bore. The gain bore of FIG. 1 is shown having a plurality of optical path segments, i.e. 11, 12 and 16. The three electrodes are each coupled to the separate optical path segments 11, 12 and 16 through respective electrode ports (not shown) in this multisegment gain bore.

In the alternative embodiment of FIG. 1, an anode is positioned between the first and second cathode and the gain bore is envisioned as having a plurality of optical path segments such as 11, 12 and 16 with the first, second and third electrode locations each being coupled to separate optical path segments through respective electrode ports (not shown). In this alternative embodiment as in those described above, the gas bypass cavity channel segments are envisioned as being positioned to pneumatically link the first and second electrode locations 20, 22 and also the first and third electrode locations 20, 24.

In another alternative embodiment of FIG. 1, the three electrodes comprise a cathode at a first electrode location and a first and second anode at a second and third electrode location, with the cathode being positioned between the first and second anode, the gas bypass cavity comprises a plurality of channel segments, and the gas bypass channel segments 56, 58, 60, 64, 62 are positioned to pneumatically link the first and second electrode locations, i.e. to link the cathode at the cathode location 20 to the anode 1 location at 22, and to pneumatically link the first and third electrode locations, i.e. the cathode at the cathode location at 20 to the anode 2 location at 24.

In yet another alternative embodiment of FIG. 1, the three electrodes comprise an anode at a first electrode location and a first and second cathode at a second and third electrode location with the anode positioned between the first and second cathodes. In this embodiment, the gas bypass cavity comprises a plurality of channel segments, the gas bypass channel segments being positioned to pneumatically link the first and second electrode locations and to also pneumatically link the first and third electrode locations. Embodiments wherein the second and third electrode locations are linked by the bypass are also envisioned.

Referring to FIG. 2, the gas bypass having segments 60, 58, 56, 64, and 62 is shown having a means for adjusting the return gas flow to minimize bias errors, such as valve 61. In the preferred embodiment, this valve is adjustable and is mechanically adjusted in the course of calibrating the ring laser gyro to minimize the bias errors. In alternative embodiments, the use of more than one valve is envisioned, making possible the independent adjustment of the return gas flow through gas bypass segments such as 58 and 64. In other alternative embodiments, the use of electrically adjusted valves is envisioned wherein the valves are adjusted in the course of calibrating the ring laser gyro. An electrically adjustable valve makes possible the remote adjustment of the valve for the purpose of compensating for other external parameters, such as temperature.

Figure 3:
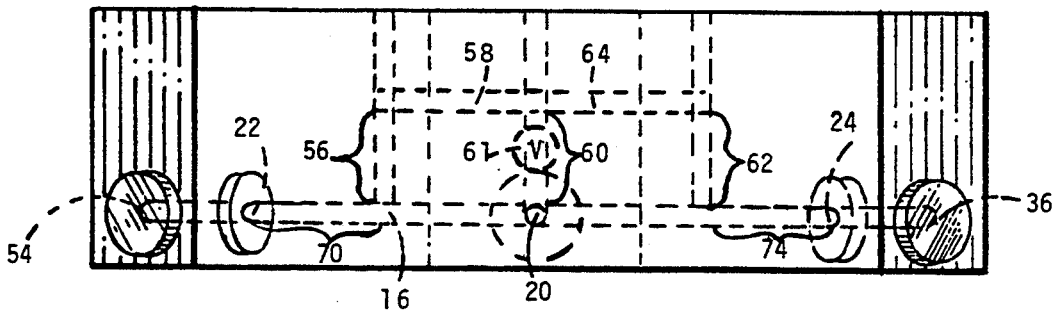
FIG. 3 is a front view of FIG. 1 showing the gas bypass cavities in phantom above the body triangular lasing path.

FIG. 3 illustrates that the optically resonant cavity segments 58 and 64 are out of the plane of the lasing path segments 14, 16 and 18. Anode 1 and anode 2 locations 22, 24 are shown in phantom. Valve V, 61, is shown and is used for adjusting the gas flow to minimize bias errors in the course of gyro calibration. Similar valve means are contemplated for use in othr ring laser gyro body configurations, i.e., such as those depicted in FIGS. 4, 6 and 8.

FIG. 4 depicts a rectangular ring laser gyro body 100 showing a square lasing path having lasing segments 102, 104, 106 and 108. The gas bypass cavity comprises segments 124, 122, 126, 120 and 118 and is adapted to pneumatically couple the electrode locations 112, 114 and 116. The gas bypass cavity has a cross section selected to reduce axial current driven gas flow between the respective electrode locations as in the embodiment of FIG. 1. The gas bypass cavity has two pneumatic path lengths consisting of segments 124, 122, and 126, 120, 118, each of which are in excess of the pneumatic path length of the gain bore paths 128 and 130 to inhibit ionization. The alternative embodiment of FIG. 4 comprises a cathode (not shown) at cathode location 114, a first anode (not shown) at the anode 1 location at 112 and a second anode (not shown) at the anode 2 location 116. The cathode, first anode and second anode are each coupled to the active gas medium within the optically resonant cavity via respective bore channels, i.e. 132, 134 and 136, each respective bore channel being ported into the optically resonant cavity 110 through a respective aperture in the electrode port gain bore section of the optically resonant cavity.

The gas bypass cavity of the alternative embodiment of FIG. 4, further comprises a plurality of gas bypass cavity segments; the gas bypass cavity segments, such as 124, 122, 126, 120 and 118 are coupled to form the gas bypass cavity. The gas bypass cavity is ported to the optically resonant cavity relatively close to each respective electrode location through a respective gas bypass port in the optically resonant cavity at locations 138, 140 and 142, each respective gas bypass port also being positioned relatively close to a respective electrode location; whereby, the gas bypass cavity operates to control the return gas flow and reduce the differential pressure between the electrode locations through the gas bypass ports.

Figure 5:
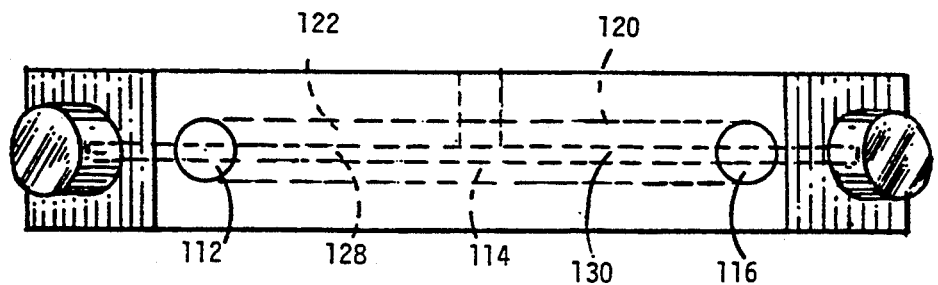
FIG. 5 is a front elevation view of FIG. 4.

FIG. 5 is a front elevation view of the rectangular ring laser gyro body of FIG. 4 showing the gas bypass cavity bore channels at locations 112 and 116 to be circular in cross section and of a larger diameter than that of lasing cavity segments 128 and 130 shown in phantom.

FIG. 6 is a plan elevation view of a 5 sided ring laser gyro body 210 showing the gas bypass cavity comprising two respective channels 252, 250, 254 and 254, 220, 248 coupled to the 5 sided optically resonant cavity having five optical segments, such as 232, 234, 236, 238 and 240. The gas bypass cavity is adapted to pneumatically couple electrode locations, such as the cathode location 242 to the anode 1 location at 244 and to the anode 2 location at 246. The gas bypass cavity pneumatically couples the respective electrode locations; thereby, reducing the pressure differential between the electrode locations of opposite polarity, the reduced pressure differential reducing the ring laser gyro bias errors by reducing the axial current driven gas flow in the active gas medium, i.e., between cathode location 242 and anode 1 location 244 and between cathode location 242 and anode 2 location 246.

The gas bypass cavity pneumatically couples the respective electrode port locations along the gain bore comprising segments 243 and 245; thereby controlling the return gas flow and reducing the pressure differential between the electrode locations of opposite polarity. By controlling the return gas flow through the gas bypass, bias errors are reduced. As in the case of the embodiment of FIG. 1, the embodiment of FIG. 5 envisions the use of a means for adjusting the return gas flow such as a mechanically or electrically adjusted valve or valves in one or more of the gas bypass segments.

The gas bypass cavity is comprised of two segments comprising segments 252, 250, 254 and 254, 220, 248. These gas bypass segments couple electrode locations 244, 242 and 246 along the gain bore segments 243 and 245. The path length between electrodes of opposing polarity through these respective gas bypass segments is selected to be of sufficient length to inhibit ionization. The five optical path segments of FIG. 6, i.e. 232, 234, 236, 238 and 240, are optically coupled together within the body 210 to form the optically resonant cavity in the shape of a polygon. Each optical segment is coupled in series pairs to link the optical axes at optical junctions such as at mirrored surfaces 256, 258, 260, 262 and 264. These mirrored surfaces form a reflective means for directing the pair of counterpropagating light beams at the optical junctions to follow the closed optical circuit around lasing paths 232, 234, 236, 238 and 240. As in the case of the triangular embodiment of FIG. 1, the mirrors are adjusted to position the counterpropagating lights beams on the optical axis of lasing path segments 232, 234, 236, 238 and 240.

Figure 7:
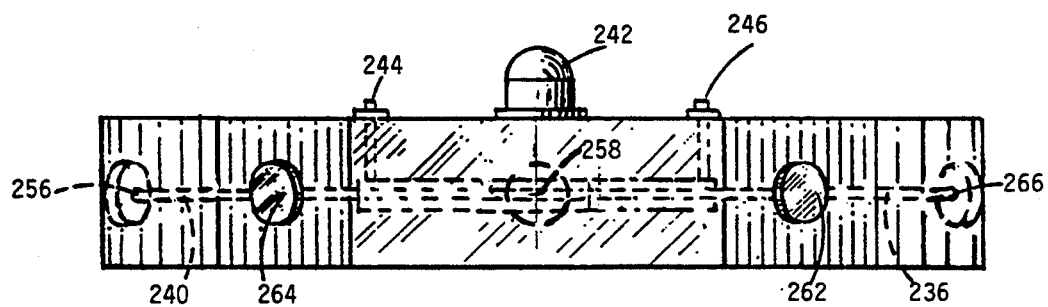
FIG. 7 is a front elevation view of FIG. 6.

FIG. 7 is a front elevation view of the embodiment of FIG. 6 showing the diameter of the internal gas bypass cavity 220 being of greater diameter than that of the optical path segments such as 240 and 236 shown in phantom.

Figure 8:
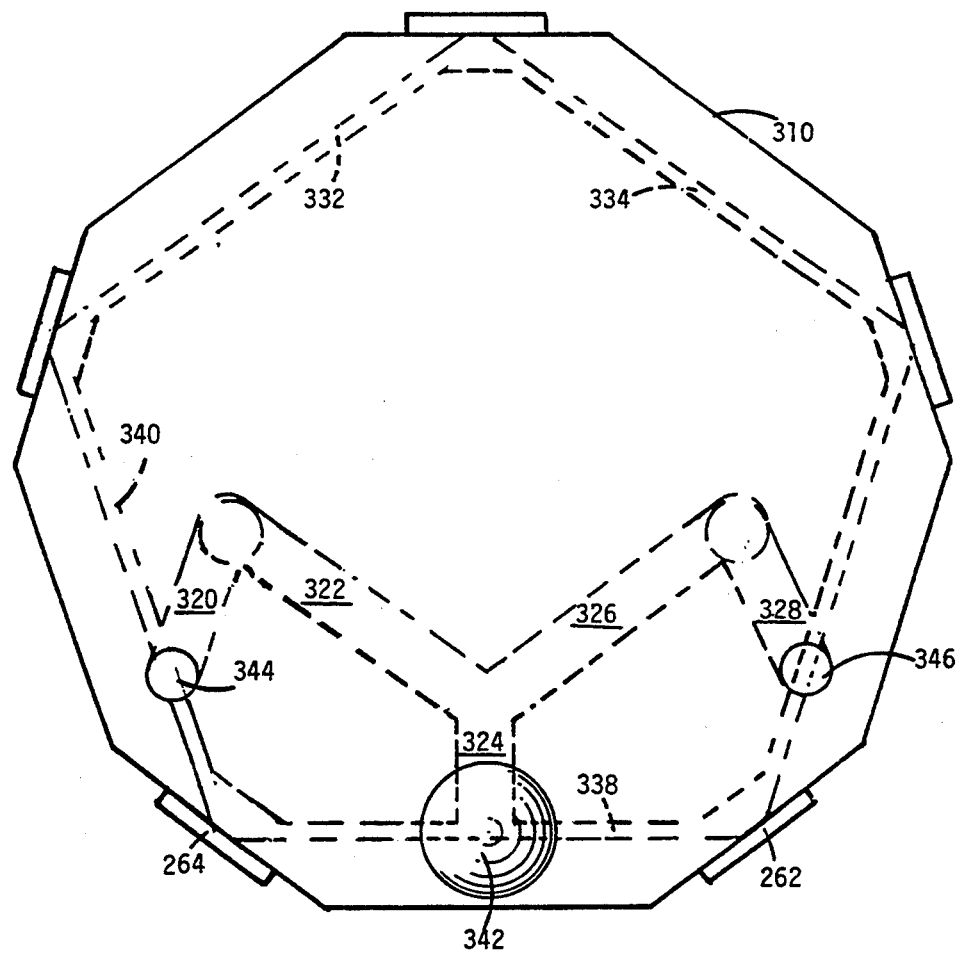
FIG. 8 is a top plan view of a five-sided ring laser gyro body depicting a five-sided lasing path and an elongated gas bypass cavity having a cross-section larger than that of the lasing path, each being shown in phantom.

FIG. 8 is a plan elevation view of a 5 sided ring laser gyro body 310 having lasing path segments 332, 334, 336, 338 and 340 having a gas bypass cavity comprising two segments comprising 320, 322, 324 and 324, 326, 328, each segment coupling electrode locations such as 342, 344, and 346 on the 5 sided optically resonant cavity. This embodiment depicts the electrode locations of opposite polarity being located on different optical segments. Cathode location 342 is on optical segment 338 while anode 1 location at 334 is on optical segment 340 and anode 2 location at 346 is on optical segment 336. Mirrored surfaces 356, 358, 360, 362, and 364 direct the counterpropagating light beams around the closed optical path through optical segments 332, 334, 336, 338 and 340. A means for generating an output signal as described for the embodiment of FIG. 1 is provided, but is not shown in FIG. 8 or FIG. 6.

Figure 9:
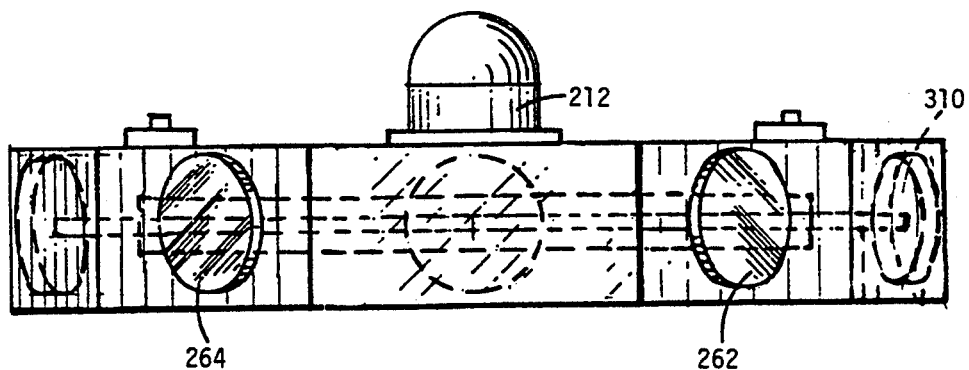
FIG. 9 is a front elevation view of FIG. 8 showing a cathode on the top surface.

FIG. 9 is a front elevation view of the 5 sided ring laser gyro body 310 of FIG. 8 depicting cathode 312, partially transmissive mirror 362 and mirror 364.

Accordingly there has been described a ring laser gyro using a novel gas bypass cavity to reduce the tendency of the ring laser gyro to exhibit bias errors by adjusting the return gas flow in the active gas medium by providing a gas bypass cavity through which differential pressure between respective electrode locations is reduced. Although the invention has been disclosed and illustrated in detail it is to be clearly understood that the same is by way of illustration an example only and is not to be taken by way of limitation, the spirit and scope of this invention being limited only by the terms of the appended claims.

What is claimed is:

1. A ring laser gyro, comprising:

an envelope for an optically resonant cavity having a gain bore, wherein said envelope contains an active gas medium electrically energizable electrode means having at least three symmetrically positioned electrodes at electrode locations coupled by said gain bore within said envelope for establishing an electrical discharge in said active gas medium between said electrode locations thereby exciting a pair of light beams along a lasing path through said gain bore between said electrode locations, said light beams counterpropagating in said optically resonant cavity, wherein said light beams exhibit bias errors;

means responsive to said counterpropagating light beams for measuring a difference in the frequencies of said counterpropagating light beams and for generating an output signal for said gyro said output signal indicating the direction of rotation and the absolute angular rate of the ring laser gyro on its sensitive axis;

said active gas medium having an axial current driven gas flow and return gas flow induced by said electrical discharge, said axial current driven gas flow and said return gas flow being unequal and contributing to said bias errors; and a gas bypass cavity characterized to pneumatically couple said electrode locations, said gas bypass cavity having a cross section and length selected to conduct a part of said return gas flow between said respective electrode locations, said cross section and length being characterized to inhibit ionization of said gas medium within said gas bypass cavity and to minimize said bias errors;

whereby, said gas bypass cavity operates to reduce said ring laser gyro bias errors by reducing said return gas flow in said gain bore by providing a gas bypass cavity through which differential pressure between respective electrode locations is reduced.

2. The combination of claim 1 wherein said gas bypass cavity has a pneumatic path length in excess of the penetrating path length of said gain bore between said electrode locations;

whereby, said gas bypass pneumatic path length is characterized to inhibit ionization of said gas medium within said gas bypass cavity.

3. The combination of claim 1; wherein, said envelope has three optical path segments coupled together within said envelope to form said optical resonant cavity in the shape of a triangle.

4. The combination of claim 1 wherein said electrically energizable electrode means further comprises a cathode;
a first anode; and,
a second anode; said cathode, first anode and second anode each being coupled to said gain bore containing said active gas medium within said optically resonant cavity via respective bore channels within said envelope, each respective bore channel being ported into said gain bore through a respective electrode port in said optically resonant cavity positioned at said respective electrode locations.

5. The combination of claim 1, wherein said gas bypass cavity further comprises:
a plurality of gas bypass cavity segments; said gas bypass cavity segments being coupled to form said bypass cavity, said gas bypass cavity being ported to said gain bore at each respective electrode location through a respective gas bypass port in said optically resonant cavity, each respective gas bypass port being positioned relatively close to a respective electrode location;

whereby, said gas bypass cavity operates to reduce differential pressure between said electrode locations by providing an alternate pneumatic path through which part of the return gas flow can be guided and controlled through said gas bypass ports.

6. The combination of claim 1; wherein, said envelope is further comprised of a plurality of optical path segments, each optical path segment having an optical axis, said optical path segments being optically coupled in series pairs to link said optical axes at optical junctions to form a relatively closed optical circuit within said envelope;
reflective means for directing said pair of counterpropagating light beams at said optical junctions to follow said closed optical circuit;
said electrically energizable electrode means having three electrode locations coupled by said gain bore within said envelope for establishing an electrical discharge in said active gas medium, said electrodes being positioned to produce axial current driven gas flow in said active gas medium in opposing directions to balance the resultant gas flows in said opposing directions;
said gas bypass cavity being adapted to pneumatically couple said three electrode locations, said bypass cavity cross section and length being selected to minimize said bias errors.

7. The combination of claim 6 wherein said three electrodes further comprise a cathode at a first electrode location and a first and second anode at a second and third electrode location, said cathode being positioned between said first and second anode.

8. The combination of claim 7 wherein said gain bore has a single optical path segment and wherein said first, second and third electrodes are each coupled to said single optical path segment through respective electrode ports in said gain bore.

9. The combination of claim 7 wherein said gain bore has a plurality of optical path segments and wherein said first, second and third electrodes are each coupled to separate optical path segments through respective electrode ports in said gain bore.

10. The combination of claim 6 wherein said three electrodes further comprise an anode at a first electrode location and a first and second cathode at a second and third location, said anode being positioned between said first and second cathodes.

11. The combination of claim 10 wherein said gain bore has a single optical path segment and wherein said first, second and third electrodes are each coupled to said single optical path segment through respective electrode ports in said gain bore.

12. The combination of claim 10 wherein said gain bore has a plurality of optical path segments and wherein said first, second and third electrodes are each coupled to separate optical path segments through respective electrode ports in said gain bore optical path segments.

13. The combination of claim 7 wherein said gas bypass cavity comprises a plurality of channel segments,
said gas bypass cavity channel segments being positioned to pneumatically link said first and second electrode locations and to pneumatically link said first and third electrode locations.

14. The combination of claim 10 wherein said gas bypass cavity comprises a plurality of channel segments, said gas bypass channel segments being positioned to pneumatically link said first and second electrode locations and to pneumatically link said first and third electrode locations.

15. The combination of claim 5 wherein said gas bypass further comprises at least one means for adjusting said return gas flow to minimize said bias errors.

16. The combination of claim 15 wherein said means for adjusting said return gas flow further comprises at least one adjustable valve.

17. The combination of claim 16 wherein each said adjustable valve is mechanically adjusted to minimize said bias errors.

18. The combination of claim 16 wherein each said adjustable valve is electrically adjusted to minimize said bias errors.

19. The combination of claim 1; wherein said envelope has four optical path segments coupled together within said envelope to form said optical resonant cavity in the shape of a rectangle.

20. The combination of claim 1; wherein said envelope has five optical path segments coupled together within said envelope for form said optical resonant cavity in the shape of a pentagon.

* * * * *

UNITED STATES PATENT AND TRADEMARK OFFICE
CERTIFICATE OF CORRECTION

PATENT NO. : 5,341,208
DATED      : August 23, 1994
INVENTOR(S) : James P. Hauck It is certified that error appears in the above-identified patent and that said Letters Patent is hereby corrected as shown below:

Title page, item [54] should read

GAS BYPASS FOR BIAS REDUCTION IN LASER GYROSCOPES

Column 1, line 2,      title should read

GAS BYPASS FOR BIAS REDUCTION IN LASER GYROSCOPES

Signed and Sealed this

Eighth Day of November, 1994

*Attest:*

BRUCE LEHMAN

*Attesting Officer*     *Commissioner of Patents and Trademarks*